Aug. 6, 1940.    J. F. JOY    2,210,836
MOTOR BEARING SEAL LUBRICATING MEANS
Filed Oct. 21, 1936
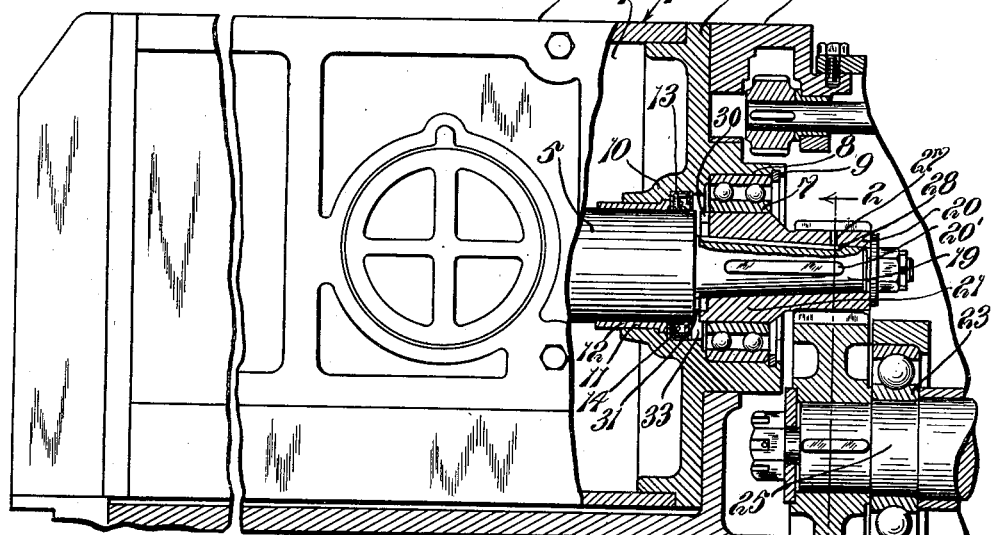
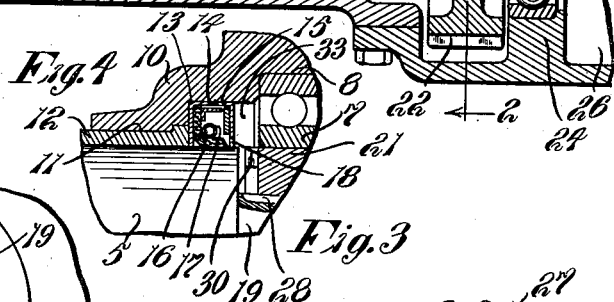
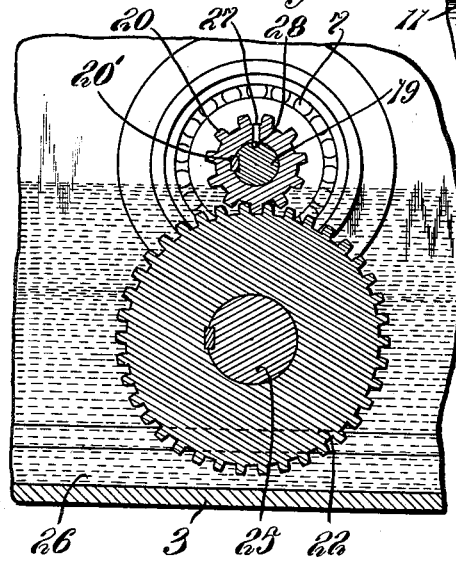
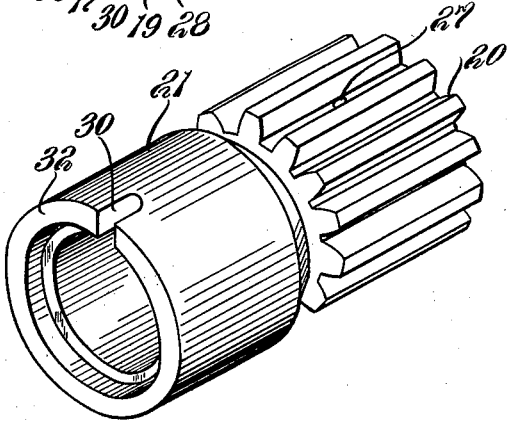
Inventor:
Joseph F. Joy
by Louis A. Maxson.
Atty.

Patented Aug. 6, 1940

2,210,836

UNITED STATES PATENT OFFICE 2,210,836

MOTOR BEARING SEAL LUBRICATING MEANS

Joseph F. Joy, Claremont, N. H., assignor to Sullivan Machinery Company, a corporation of Massachusetts Application October 21, 1936, Serial No. 106,848

8 Claims. (Cl. 184—11)

My invention relates generally to electric motors, and more particularly to improvements in the devices employed with electric motors for the purpose of preventing the injury to the windings thereof by lubricant.

As is well known to those familiar with the art of coal cutting, coal mining machines operate frequently in sloping rooms. A large percentage of the coal mining machines used throughout the world are of the electrically-operated type. In these machines, and particularly in the bottom cutting type of such machines, such as longwall and shortwall machines, it is customary to employ an electric motor for driving a train of gearing for actuating a feed drum, or a plurality of feed and control drums, and to use, also actuated quite generally by such same motor, a train of gearing actuating a circulating cutter chain. In view of the very hard use to which these machines are put it is imperative that their gearing be most adequately lubricated. Accordingly, it is common practice to provide oil sumps in the gear casing and to have a portion of the gearing dip into the oil and throw the oil about so that all portions of the gearing will be most effectually lubricated. Now this very throwing around of the oil increases the danger of the oil reaching the windings of the electric driving motor. Moreover, such machines are often used in sloping places, and accordingly, particularly in the event that the slopes prove to be longitudinal of the machine, there is a strong probability that the oil may rise as high as the level of the opening through which the motor driving pinion is actuated by the motor shaft. It is therefore obvious that this type of machine demands a most effective means for preventing the access of lubricant to the windings of its driving motor. Such devices as described do present an extremely severe problem of combining effective lubrication with effective motor protection. There are of course many other places where motor protection is necessary, even if not equally necessary; and it is an object of my invention to provide an improved means whereby a motor of the electric type may drive gearing portions of which extend into an oil bath and therefore throw the oil around to all parts of the gear casing, and at the same time protect the motor windings from injury by the lubricant. It is a further object of my invention to provide improved means for improving the lubrication of the motor shaft bearings, while at the same time providing a very secure protection against injury of the motor windings by travel of lubricant along the motor shaft and access thereof into the motor casing proper. Other objects and advantages of my invention will hereinafter more fully appear.

In a preferred form my invention comprises forming a chamber in which the motor windings, both field and armature, or stator and rotor, are housed, providing outside said housing appropriate bearing means for the motor rotor shaft, and providing between said bearing means and the wall of said housing and surrounding said motor shaft a seal continuously wet with lubricant and thereby prevented from burning, and effectually sealing said casing against ingress of lubricant. Desirably a suitable bushing closely fitting the shaft may be mounted within the housing wall surrounding the rotor shaft and inwardly of the lubricant seal. Desirably the seal may be maintained wet with lubricant pumped by the rotating gearing driven by the motor driving pinion, and preferably the lubricant may be delivered to the seal, to keep the same wet, through passage means carried by the motor shaft and/or the motor driving pinion, and supplied with lubricant through the coaction of the motor driving pinion and a meshing gear. Desirably, moreover, the lubricant employed to maintain moist the lubricant seal may be discharged in any excess quantity thereof, through the motor shaft bearings, whereby the latter are maintained thoroughly lubricated. Preferably a circulation from the sump to the seal, through the bearings, and back to the sump will be effective.

In the accompanying drawing, in which for purposes of illustration one illustrative embodiment of the invention has been shown:

Fig. 1 is a view, partially in side elevation and partially broken away to the central section through the motor shaft, showing a motor equipped with my improved lubricant protective device.

Fig. 2 is a vertical section on the plane of the line 2—2 of Fig. 1.

Fig. 3 is a perspective of the motor driving pinion.

Fig. 4 is a fragmentary and enlarged sectional view showing a portion of the protective arrangement including the lubricant seal.

While as previously explained my invention is adaptable to many motor installations, for purposes of illustration I have shown the same embodied in a mining machine.

Referring to the drawing, it will be observed that 1 represents the casing of a mining machine. This casing comprises, to the extent to which it is shown in the drawing, a motor housing 2 having gear casing sections 3. The motor housing 2 provides a chamber 4 within which the motor windings are housed, and the rotatable motor element is supported upon a rotating shaft 5, which projects through an end casing section 6 which supports, in its outwardly projecting portion, a bearing 7 for the rotor shaft, this bearing 7 being supported in a bore 8 in which it is held by a snap ring 9. The end wall 6 has an inwardly projecting portion 10 which has a bore 11 formed therein, in which there is mounted an elongated shouldered bushing 12 which closely fits the periphery of the rotor shaft. A suitable lubricant seal 13 is mounted at the outer end of the bushing 12 in an annular recess 14, and the lubricant seal comprises a metallic, annular, outer casing or housing 15 and a suitable absorbent hat washer 16, and a retaining spring 17 causes the washer 16 closely to fit the shaft 5. It will be observed that the annular housing 15 comprises, or rather provides, an annular opening 18 adjacent the periphery of the shaft 5.

The rotor shaft 5 is provided with a reduced, tapered projection 19 which supports the driving pinion 20. The driving pinion is keyed at 20' to the periphery of the reduced portion 19 of the shaft 5, and it may be noted that an enlarged cylindrical portion 21 of the drive pinion element is the element which fits within the bearing 7 and supports directly the motor drive shaft 5 during the rotation of the latter. The pinion 20 meshes with and drives a larger gear 22 supported in a suitable bearing 23, supported in turn in upstanding webs 24 forming a portion of the gear casing 3. The gear 22 drives a shaft 25 which is directly journaled in the bearing 23 and supports the gear 22. The gear 22 dips beneath the level of the lubricant in the chamber 26 formed within the gear casing member 3. The motor driving pinion 20 is provided with one or, if desired, more radial passages 27 which communicate with a longitudinally extending slot 28 formed in the periphery of the tapered extension 19 of the rotor shaft 5. Obviously other means for forming a longitudinally extending passage may be provided. The passage 28 extends to points adjacent the inner end of the enlarged sleevelike portion 21 which supports the motor driving pinion 20, and this sleevelike portion is provided with a radially extending notch 30 which opens into the space between the bearing 7 and the oil seal 13. It will be noted that a substantially radially extending surface surrounds the point of junction of the tapered reduced portion 19 of the rotor shaft 5 and the body of the shaft 5, and that there is a suitable oppositely-facing wall 32 formed on the sleeve portion 21 of the pinion carrying element. The passage 30 opens directly into a slightly larger annular space 33 between the motor bearing 7 and the lubricant seal 13.

Now the mode of operation of this device will be readily understood from the description which has been given. Upon the supply of current to the motor, which is enclosed within the chamber bore, the rotor shaft 5 will be caused to rotate. Rotation of the shaft 5 will cause rotation of the driving pinion 20. This will drive the gear 22. Rotation of the gear 22 will raise the lubricant contained within the lower portion of the space 26 and carry it upwards in small quantities, between the teeth of the gear 22. The lubricant so raised will be in part extruded from between the teeth, and in part upon each rotation of the pinion 20 will be forced in small quantities through the port 27 between the teeth of the pinion 20. Such lubricant will be forced through the passage 28 and notch 30 into the annular space 33, and will be there caused to pass through the annular opening 18 into contact with the hat washer 16, and to maintain the latter continuously wet with lubricant. The excess lubricant will pass downward and outward through the space between the races of the bearing 7 to the sump within the chamber 26.

Until this arrangement was perfected great difficulty was experienced in preventing the ultimate passage of lubricant from the gear casing chamber 26 along the shaft 5 and into windings in the chamber 4, with resultant motor damage. This former injurious condition I attribute to the fact that prior to the effecting of the arrangement herein described, there was not a maintaining of the lubricant seal sufficiently moist to prevent burning of the latter out of contact with the motor shaft. Accordingly, after the machine had been in use for some time, when the same was tilted to such an extent that lubricant was caused to enter the space to the inside of the bearing 7 and tend to flow along the shaft 5, that lubricant obtained access to the interior of the casing 4 because the seal in its unlubricated condition no longer acted as an effective seal due to burning thereof, but instead permitted the lubricant to pass by it and along through the small space between the rotor shaft 5 and the bushing 12.

With my improved apparatus, however, there is a constant maintaining of the lubricant seal sufficiently moist to prevent any tendency of burning thereof, and as a result, the seal is at all times thoroughly effective.

We thus have the rather anomalous situation that through a supply of lubricant to the shaft, there is prevented the passage of lubricant from the shaft.

The arrangement is simple and may employ packings of well known commercial construction, provided, however, provision be made for the continuous supply of sufficient lubricant thereto to maintain the lubricant seal thereof moist, and provided, moreover, that the packings employ an absorbent hat packing element or the like and be so arranged as to permit the access of lubricant in reasonable quantities to maintain the packing element adequately moist. Further, the flow of oil under pressure past the seal, causes dissipation of heat in the seal, thereby acting as a cooling medium as well as a lubricant.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a motor, a motor housing providing a rotor compartment, a horizontal rotor shaft, said housing comprising a head portion having a wall traversed by an opening through which said rotor shaft extends and having to the outside thereof in said opening a bearing for said shaft, a lubricant seal including an annular packing element in sealing contact with the exterior periphery of said rotor shaft and arranged between said bearing and said wall of said head portion to the outside of said wall, said packing element obstructing the flow of lubricant along said shaft toward said rotor compartment, and means operative upon rotation of said rotor shaft to deliver a positive flow of lubricant directly to said packing element at the side of the latter remote from said rotor compartment to maintain said packing element moist.

2. In combination, an electric motor having an armature shaft, gearing driven by said motor armature shaft, said motor having a motor housing providing a chamber in which the motor windings are arranged and said gearing having a casing in which the same is arranged and having a lubricant bath therein into which elements of said gearing dip, said motor housing having an end element separating the casing interior from said chamber and the motor windings, said end element formed with a bore extending therethrough and supporting at the outside thereof in the bore a bearing for said shaft, and having toward said motor-housing-chamber a lubricant seal including an annular sealing member surrounding and sealingly contacting with the exterior periphery of said shaft for obstructing flow of lubricant along said shaft toward said motor-housing-chamber, and means including elements of said gearing driven by said shaft for delivering a positive flow of lubricant directly to the side of said sealing member remote from said motor-housing-chamber to maintain said sealing member moist.

3. In combination, a motor housing having an end wall, a gearing housing adjacent said motor housing and separated by said end wall from communication with said motor housing, said motor housing having a shaft extending through said end wall for supporting a pinion on the portion thereof which extends into said gearing housing, a bearing for said shaft supported in said end wall, and an annular lubricant seal also supported in said end wall and sealingly engaging the shaft periphery for obstructing flow of lubricant along said shaft toward said motor housing, and means for transmitting lubricant in a positive stream directly between the side of said lubricant seal remote from said motor housing and said gearing housing to maintain said seal moist including passage means extending longitudinally of said shaft and lubricant pumping means for delivering lubricant to said passage means.

4. In combination, a motor housing having an end wall, a gearing housing adjacent said motor housing and separated by said end wall from communication with said motor housing, said gearing housing adapted to contain a lubricant and said motor housing having a shaft extending through said end wall for supporting a pinion on the portion thereof which extends into said gearing housing, a bearing for said shaft supported in said end wall, and an annular lubricant seal also supported in said end wall and sealingly engaging the shaft periphery for obstructing flow of lubricant along said shaft towards said motor housing, and means for transmitting lubricant in a positive stream directly between said lubricant seal at the side of the latter remote from said motor housing and said gearing housing to maintin said seal moist including passage means extending longitudinally of said shaft and lubricant pumping means for delivering lubricant to said passage means including a driving pinion on said shaft and having an opening connecting the space between adjacent teeth thereof with said passage means and a meshing gear driven by said pinion and dipping into lubricant within said gearing housing, the meshing engagement of said gear with said pinion causing lubricant to be forced through said pinion opening into said passage means.

5. In combination, an electric motor having a casing enclosing its windings, gearing driven by said motor and having a casing enclosing the same and providing a lubricant bath into which a portion of said gearing dips, operative connections between said motor and said gearing including a motor shaft supporting a pinion outside the motor casing and in the gearing casing, an annular lubricant seal surrounding said shaft and sealingly engaging the shaft periphery for obstructing flow of lubricant along said shaft toward said motor casing, and means including said pinion and a portion of said gearing for delivering a positive flow of lubricant from said lubricant bath directly to said lubricant seal at the side of the latter remote from said motor casing to maintain said lubricant seal moist.

6. In combination, an electric motor having a casing enclosing its windings, gearing driven by said motor and having a casing enclosing the same and providing a lubricant bath into which a portion of said gearing dips, operative connections between said motor and said gearing including a motor shaft supporting a pinion outside the motor casing and in the gearing casing, an annular lubricant seal surrounding said shaft and sealingly engaging the shaft periphery for obstructing flow of lubricant along said shaft toward said motor casing, and means including said pinion and a portion of said gearing for delivering a positive flow of lubricant from said lubricant bath directly to said lubricant seal at the side of the latter remote from said motor casing to maintain said lubricant seal moist, said shaft having a bearing supported by said motor casing to the outside of said lubricant seal and through which excess lubricant delivered to maintain said lubricant seal moist is returned to the lubricant bath.

7. In combination, an electric motor having a casing enclosing its windings, gearing driven by said motor and having a casing enclosing the same and providing a lubricant bath into which a portion of said gearing dips, operative connections between said motor and said gearing including a rotor shaft supporting a pinion outside the motor casing and in the gearing casing, means forming a lubricant passage extending longitudinally of said shaft at a point inside the peripheral surface of said pinion, an annular lubricant seal surrounding said shaft for sealingly engaging the shaft periphery for obstructing flow of lubricant along said shaft toward said motor casing, thereby to prevent access of lubricant to said motor windings, and means including said pinion, said passage and a portion of said gearing for delivering a positive flow of lubricant from said lubricant bath directly to the side of said lubricant seal remote from said motor casing to maintain said lubricant seal moist.

8. In an apparatus of the character described, a frame providing a lubricant-receiving-chamber, a bearing supported in said frame, a horizontal shaft mounted in said frame and journaled in said bearing, an annular seal mounted in said frame at the outer side of said bearing and surrounding said shaft, said seal sealingly engaging the shaft periphery for impeding flow of lubricant along said shaft past said seal, and means for supplying lubricant in a positive stream from said lubricant-receiving-chamber directly to the space between the inner side of said seal and the adjacent side of said bearing for lubricating the bearing and for maintaining said seal moist.

JOSEPH F. JOY.